United States Patent [19]

Brown et al.

[11] Patent Number: 5,354,569
[45] Date of Patent: Oct. 11, 1994

[54] METHOD OF PACKAGING LETTUCE FOR STORING AND SHIPPING

[76] Inventors: Richard S. Brown, 34325 Chualar Canyon Rd.; Bennett W. Brown, 34021 Chualar Canyon Rd., both of Chualar, Calif. 93925

[21] Appl. No.: 915,093

[22] Filed: Jul. 16, 1992

[51] Int. Cl.$^5$ ............................................. B65B 31/00
[52] U.S. Cl. ..................................... 426/411; 426/124; 426/419; 426/316; 220/410; 220/462; 53/434; 53/449
[58] Field of Search ............... 426/419, 418, 124, 410, 426/413, 411, 316; 220/410, 462; 229/109, 110; 53/434, 449

[56] References Cited

U.S. PATENT DOCUMENTS

| | | | |
|---|---|---|---|
| 2,424,693 | 7/1947 | Jones | 426/411 |
| 2,611,709 | 9/1952 | Plagge | 426/411 |
| 2,920,967 | 1/1960 | Heinemann | 426/411 |
| 2,967,777 | 1/1961 | Grindrod | 426/418 |
| 3,204,825 | 9/1965 | Underwood | 426/410 |
| 3,407,078 | 10/1968 | Schlichter | 426/418 |
| 3,715,860 | 2/1973 | Esty | 426/418 |
| 4,001,443 | 1/1977 | Dave | 426/419 |
| 4,055,931 | 11/1977 | Myers | 426/419 |
| 4,061,785 | 12/1977 | Nishino et al. | 426/419 |
| 4,066,401 | 1/1978 | Solomon | 426/419 |
| 4,168,597 | 9/1979 | Cayton | 426/419 |
| 4,209,538 | 6/1980 | Woodruff | 426/419 |
| 4,224,347 | 9/1980 | Woodruff | 426/419 |
| 4,411,921 | 10/1983 | Woodruff | 426/419 |
| 4,454,945 | 6/1984 | Jabarin | 426/418 |
| 4,813,791 | 3/1989 | Cullen et al. | 426/411 |
| 4,840,271 | 6/1989 | Garwood | 426/419 |
| 5,093,080 | 3/1992 | Keller | 426/419 |

FOREIGN PATENT DOCUMENTS

| | | | |
|---|---|---|---|
| 0253434 | 1/1988 | European Pat. Off. | 426/419 |
| 60-126032 | 7/1985 | Japan | 426/419 |
| 764796 | 1/1957 | United Kingdom | 426/410 |
| 1378140 | 12/1974 | United Kingdom | 426/410 |

OTHER PUBLICATIONS

Wiley Encyclopedia of Packaging Technology J. Wiley & Sons 1986 pp. 24–29, 66–81.
Packaging, Japan Nov. 1985 pp. 17–22.
Chemical Engineering vol. 64, No. 4 p. 106.
Modern Packaging Aug. 1941 pp. 44, 45.

*Primary Examiner*—Steven Weinstein
*Attorney, Agent, or Firm*—Robert J. Schaap

[57] ABSTRACT

A container system which is environmentally controlled for the packaging and shipment of vegetables, and particularly of lettuce, such as iceberg lettuce. The packaging relies upon a reusable paperboard container which is of a polygonal shape, such as an octagonal shape, providing a large number of corner margins which afford strength in stacking of like containers on pallets. A plastic liner is disposed within the paperboard container and receives the vegetables such as the heads of lettuce. This liner is evacuated through a small incision made in the liner and the liner is sealed, or the former air atmosphere is replaced with a modified atmosphere, such as a high carbon monoxide concentration or nitrogen atmosphere, and thereafter, the opening is sealed. The modified atmosphere precludes the oxidation and deterioration of the lettuce or other vegetable product. In a more preferred embodiment, a pair of plastic liners, comprising inner and outer liners, are employed. When the inner liner is filled, the pair of liners are then rolled over and sealed. A small incision is made in the inner liner in order to evacuate the air from the environment in which the lettuce is held. Thereafter, the small opening used for evacuating the air is sealed. The same procedure takes place with the second or outer liner in that it is evacuated and charged with a modified carbon monoxide or nitrogen atmosphere and the opening thereof sealed. In this way, if there is a leak in the inner liner, the lettuce or other vegetable will only be exposed to the modified carbon monoxide or nitrogen atmosphere and not oxygen which causes a very rapid deterioration of the vegetables. Leakage through the outer liner will not injure the vegetables as long as the inner liner remains secure and intact.

8 Claims, 3 Drawing Sheets

METHOD OF PACKAGING LETTUCE FOR STORING AND SHIPPING

BACKGROUND OF THE INVENTION

1. Field of the Invention

This invention relates in general to certain new and useful improvements in container systems for the storage and transport of vegetables and, more particularly, to a container system which utilizes a reusable outer shell and at least one inner liner which contains a modified atmosphere for preserving the vegetables.

2. Brief Description of the Prior Art

While watermelons and fruits of a substantial weight are shipped in polygonal paperboard containers, such as octagonal containers, vegetables such as lettuce heads, are conventionally shipped in disposal paperboard containers which are of a rectangular construction.

Lettuce heads contain large amounts of entrained water which often leaves the head in the form of sap, or through evaporation from the leaves. This moisture penetrates the paperboard containers and can further harbor and promote bacterial growth. The entrained water in the lettuce heads causes some deterioration of the paperboard container during transit and shipment, and therefore, the containers themselves must be of a fairly thick and substantial construction. This results in a fairly significant cost for each container which thereby adds to the overall cost of shipping lettuce and similar good products.

In many cases, the lettuce and similar food products must be shipped for some substantial distance and, as a result, the containers are required to maintain their structural integrity for the transit period, which could be as much as four to six days. Since the containers are usually penetrated by water and/or sap at their destination, they are no longer available for reuse and must be destroyed.

In the prior art, when rectangularly-shaped shipping containers are taken out to a field and filled with lettuce, they usually assume a substantial weight in the range of several hundred pounds or more. Consequently, each of these containers must be sturdy and moreover, they must be located on wooden pallets for purposes of moving the same. Usually, the pallets are moved by forklift trucks. Furthermore, the container ends are sealed with staples. As a result, the containers themselves are often punctured by nails on the pallets and clearly the staples which secure the container ends may project into the interior space of the container. Since the containers are often moved from trucks to processing stations, there is a substantial amount of handling involved in the processing and transport of these containers of lettuce. This continuous handling and rough treatment lends to the early fatigue of the paperboard container, further militating against its reuse.

It is well known that the heads of lettuce deteriorate rapidly in the presence of oxygen. It would therefore be desirable to store and transport the lettuce in an oxygen-free environment. There have been attempts to package heads of lettuce in relatively small quantities (e.g. six heads of lettuce) in a plastic bag which is sealed with an inert atmosphere, such as carbon monoxide and placed in a rectangular cardboard container for shipping.

While this packaging of a small quantity of lettuce is effective for six or eight heads in a plastic bag, it has not been applicable to shipment of lettuce in large quantities as, for example, a transport container in which several hundred heads of lettuce may be stored in a single container. It was always assumed and correctly so, that the rough handling to which the large transport containers are subjected would quickly damage any plastic bags if the staples of the containers themselves did not damage and rupture the plastic bag.

When lettuce reaches its destination, as for example, a regional processing facility, the lettuce must again be peeled so that the outer layers or leaves are removed. Usually, the outer layers, when contacted by air, turn brown or wilt and dehydrate fairly quickly. After several days of exposure, many of the outer leaves are unusable and have an unsightly appearance. Consequently, these outer leaves must be manually removed. It has been estimated that as much as one-third of each head of lettuce is removed before it is rendered usable, either by the processor, a restaurant or for display in a grocery store or other location. Consequently, it is reasonably for one-third of the cost of the lettuce is wasted, not to mention the cost of the transport for that wasted lettuce.

Closely related to the problem of wasted lettuce leaves is the attendant labor costs required for removing the outer leaves of each head of lettuce. In some locations, there is an abundance of available low-cost labor, such as in farm communities where the lettuce is processed and packaged. However, when the outer leaves of the lettuce are manually removed at a different site, as for example, in a city, labor cost is substantially higher. As a result, in many cases, high-cost labor is used to perform the menial task of removing leaves of lettuce from each of the heads.

Many institutions such as regional salad processing facilities or restaurants would desire heads of lettuce which are totally usable in a form as packaged. Consequently, it would be desirable to "core" the lettuce, that is to remove the lettuce core before shipping. Again, coring of the lettuce at a farm-site community results in a much lower labor costs than which would be incurred for coring of the lettuce at a destination. Nevertheless, even when the lettuce is cored, the necessity of removing the outer leaves still arises. There is a substantial need for some means to ship lettuce in an environmentally protected container such that the lettuce will not deteriorate even when stored or transported for four to six days or more.

OBJECTS OF THE INVENTION

It is, therefore, one of the primary objects of the present invention to provide a packaging system for storage and transport of vegetables in quantities of several hundred pounds or more and which precludes deterioration of the vegetables when stored and transported in refrigerated containers.

It is another object of the present invention to provide a packaging system for vegetables of the type stated in which the vegetables can be stored and transported in reusable containers without any significant damage to the containers during storage and transport.

It is a further object of the present invention to provide a packaging system for vegetables of the type stated in which the vegetables can be transported in a relatively oxygen-free atmosphere and which thereby precludes deterioration of the vegetables.

It is also an object of the present invention to provide a packaging system, as well as a method for packaging vegetables and like products, which reduces the overall labor cost normally incurred in the sale and marketing of vegetables and like products.

It is another salient object of the present invention to provide a packaging system of the type stated which not only precludes deterioration of vegetables and like products, but which also maintains a relatively safe and clean contamination-free atmosphere for the storage and transport of vegetables and like products.

It is an additional object of the present invention to provide a method of transporting vegetables by sealing the vegetables in at least one and preferably a pair of plastic liners having a modified non-oxygen atmosphere.

It is still another object of the present invention to provide both a packaging system and a method for the transport and storage of lettuce which is highly effective and which can be provided at a low cost.

With the above and other objects in view, our invention resides in the novel features of form, construction, arrangement and combination of parts presently described and pointed out in the claims.

BRIEF SUMMARY OF THE INVENTION

The present invention relates in general to a container system for the storage and transport of food products, such as vegetables and primarily for the storage and transport of lettuce. While the present invention is usable in the storage and transport of a large number of food products, it has been developed for and is highly effective in the storage and transport of vegetables such as lettuce. Therefore, merely for purposes of illustrating and describing the invention, it will be described in connection with the storage and transport of lettuce, such as iceberg lettuce or the like.

The packaging system of the present invention generally relies upon an outer paperboard container which is comprised of a tubular side wall or so-called "tube" and upper and lower caps. Each of the upper and lower caps are provided with angularly struck flanges so as to tightly extend over end walls of the tube and thereby fit onto the ends of the tube. These caps thereby function as upper and lower caps. In this way, staples or like fasteners are not required for securement of the caps to the tubular side wall of the tube. Furthermore, no staples are used in the construction of the paperboard container.

The container is effectively reusable, although in some cases, the caps can be damaged by virtue of sliding on wooden pallets or the like. Nevertheless, the tubular side wall or tube is the expensive portion of the container and is capable of being reused for a large number of shipments.

The cardboard outer containers which are used are preferably polygonal containers having more than a quadrilateral construction, that is, more than four sides. In a more preferred embodiment, the outer tubes are usually octagonally shaped so as to provide a total of eight corners. Inasmuch as the corners are the portions of the tubular container which transmit vertical loads, and since the loads are distributed over eight corners, as opposed to four corners in a quadrilateral container, it is now possible to stack several of the containers and associated pallets on top of one another.

In one embodiment of the invention, a foldable flexible liner, such as a plastic liner, is inserted into the outer paperboard container and this liner has a low oxygen transpiration rate and therefore, is nearly impervious to air. This liner is sized to receive the heads of lettuce in large quantities. Thereafter, when filled, a small hole is punctured in the liner and air is evacuated therefrom. After the flushing of air, the liner is then directly sealed or filled with an inert atmosphere, such as a high carbon monoxide or nitrogen content atmosphere, and the opening is sealed.

Prior to the evacuating and recharging of a new atmosphere in the liner, the upper end of the liner is rolled over and sealed to the side wall so as to provide a complete air-impervious inner chamber which receives the lettuce or other vegetable product.

In a more preferred embodiment, a pair of plastic liners are inserted in each of the outer paperboard containers and both of the liners are generally gas-impervious and particularly, impervious to air. One of the plastic liners is located within the other so as to provide an inner and an outer liner. The heads of lettuce are stored in large quantities in the inner liner. In some cases, several hundred heads of lettuce are located in each container. After the container is filled, the upper end of the inner liner is then sealed in a manner to be hereinafter described. Thereafter, a small hole is punctured in the inner liner and air is evacuated therefrom. If desired, the inner liner can then be refilled with an inert atmosphere, such as a high carbon monoxide or nitrogen content atmosphere. Thereafter, the opening in the inner liner is sealed as, for example, by a piece of tape or the like.

After sealing of the inner liner, the outer upper ends of the outer liner are then rolled together and sealed so as to form an air-tight chamber surrounding the inner liner. Again, a small opening is made in the outer liner and the air is evacuated from the outer liner and replaced with an inert atmosphere containing a high percentage of carbon monoxide or nitrogen gas. Again, the small opening in the outer liner is then sealed. After completely sealing the atmosphere within each of the liners, the upper cap is located on the upper end of the tube or tubular side wall.

In the packaging arrangement as previously described, the lettuce can remain, as long as refrigerated, for a substantial period of time since it will not wither or deteriorate as a result since there is no oxygen exposure. Moreover, since the containers themselves contain virtually no metal pieces, there is little or no risk of puncturing the inner or the outer liners within the paperboard container. As long as there are no large protruding objects such as long nails extending beyond the wooden palate, then the packaged lettuce remains in a environmentally controlled atmosphere.

Moreover, since the heads of lettuce are contained with one or more waterproof plastic liners, there is little or no chance for water or lettuce sap damage to the outer paperboard container and which previously resulted in a large portion of the damage or contamination to the containers. Consequently, the containers, and particularly the cardboard portions thereof, can be reused on several occasions for the storage and transport of additional loads of lettuce.

By utilizing the packaging technique heretofore described, it is now possible to literally ship lettuce prepared at a site near a farm area and transport the same in a ready condition for use to a location thousands of miles in distance from the site of growing and initial processing. Thus, the lettuce can be cored and with any outer layers removed at the processing plant near the farm site before shipping. Thus, when the heads of lettuce reach their destination, they are almost immediately ready for use in shredding or chopping operations or preparation.

As mentioned above, one of the concerns encountered in the storage and transport of lettuce are metal fragments. It has been found that by sealing the outer margins of the plastic liners with a releasable tape, that there is no need for knives, razor blades or the like to open the liners. The workers who require access to heads of lettuce can merely pull the strips of adhesive tape from the bags thereby affording immediate access. Knives or razor blades are not present to accidentally fall into slicing equipment and therefore, the final salad.

The present invention possesses many other objects and advantages which will become more fully apparent from a consideration of the forms in which it may be embodied. One of these forms is shown in the accompanying drawings and described in more detail in the following detailed description of the invention. However, it is to be understood that these drawings and the detailed description are set forth only for purposes of illustrating and describing the general principles of the invention and are not to be taken in a limiting sense.

BRIEF DESCRIPTION OF THE DRAWINGS

Figure 1:
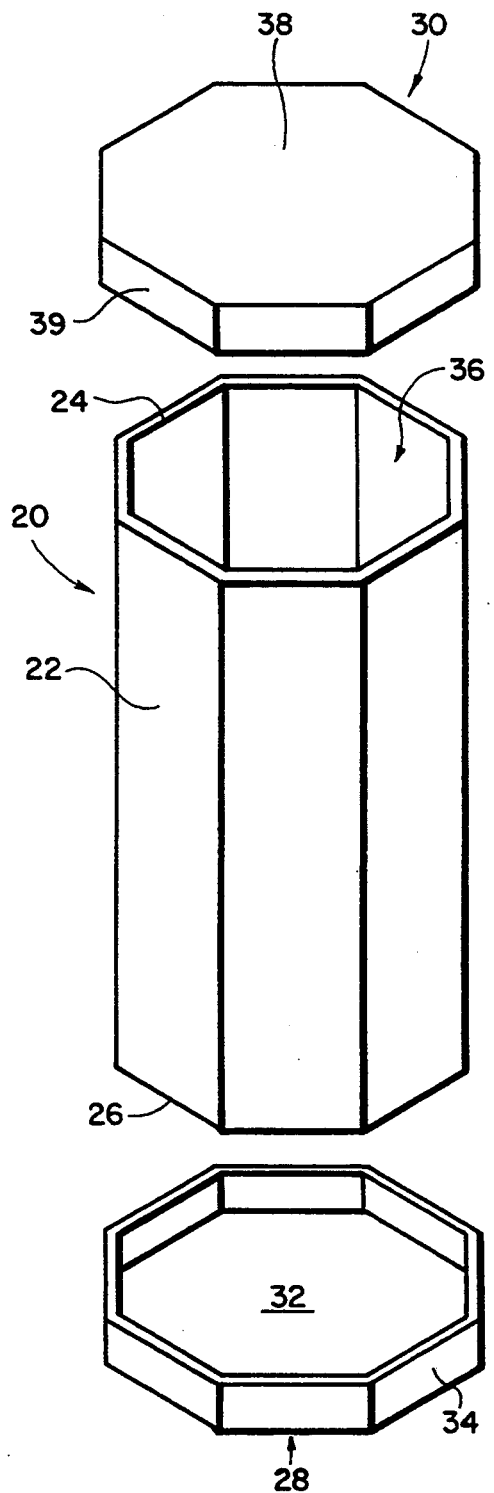
Figure 2:
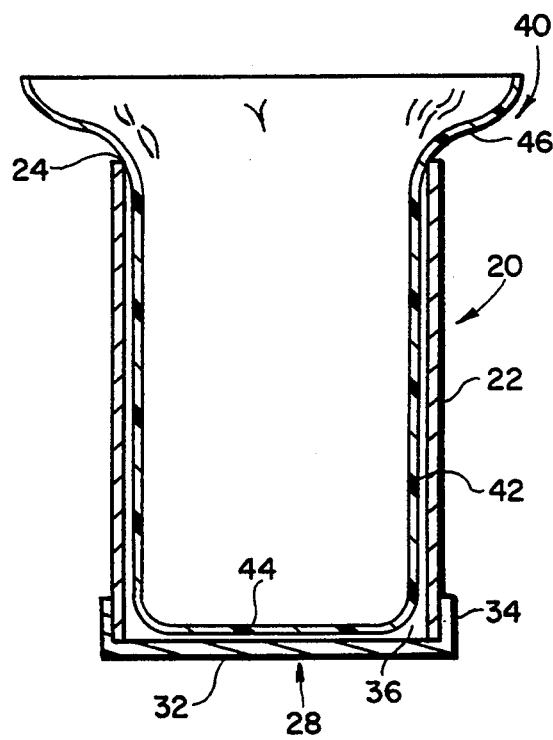
Figure 3:
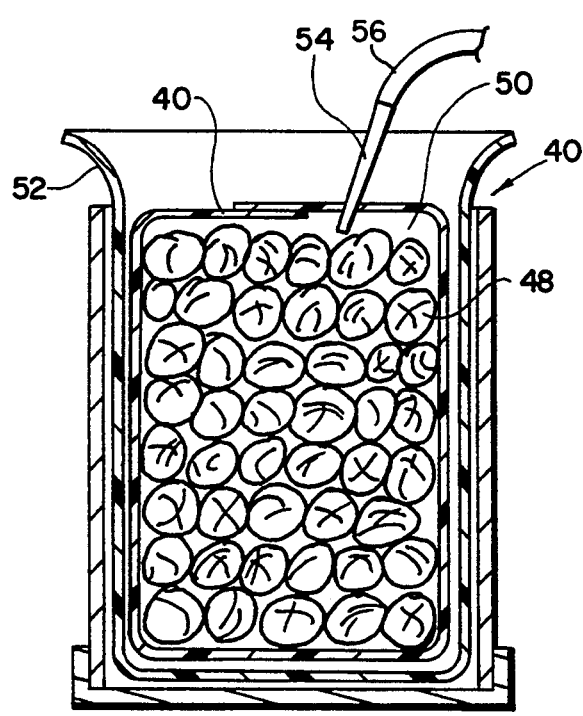
Figure 4:
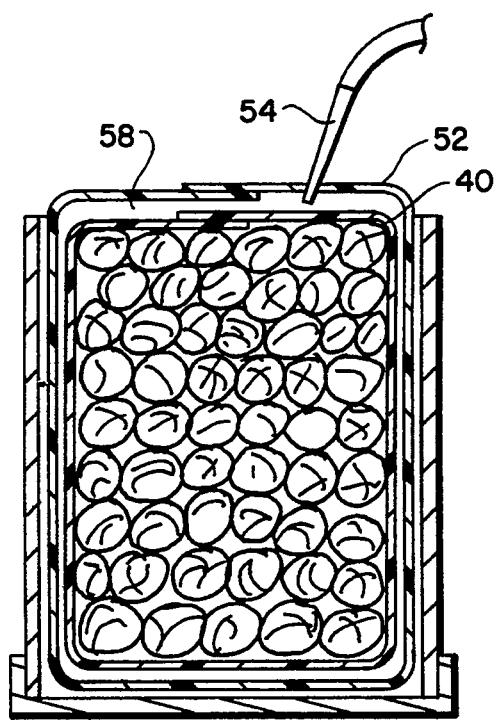
Figure 5:
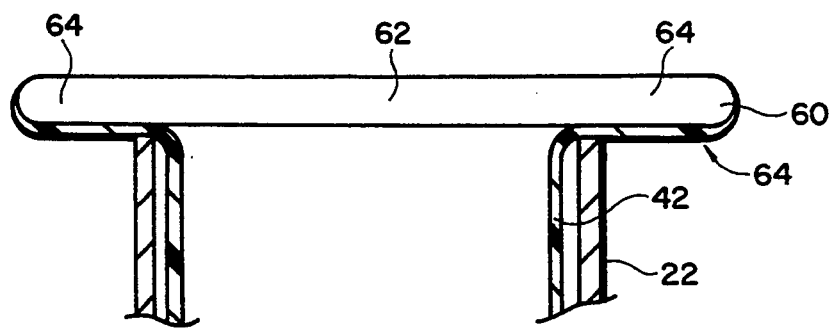
Figure 6:
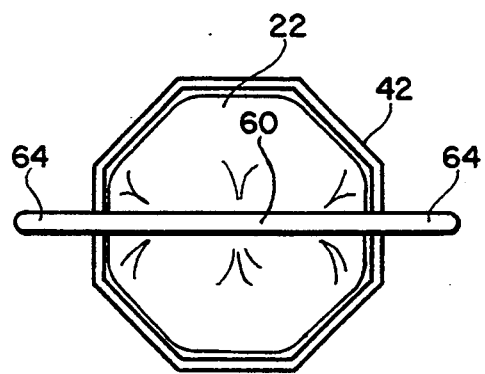
Figure 7:
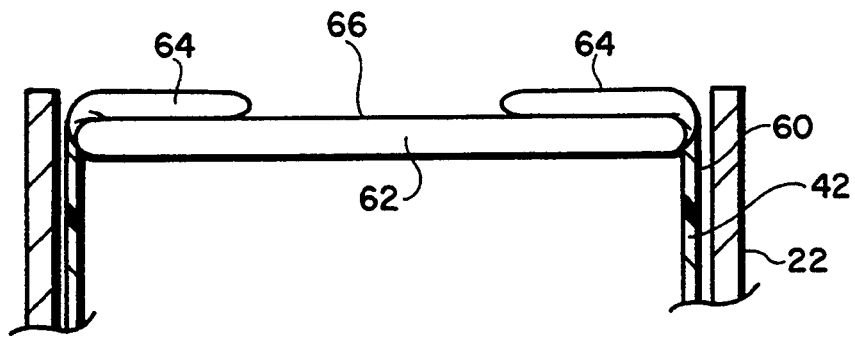
Figure 8:
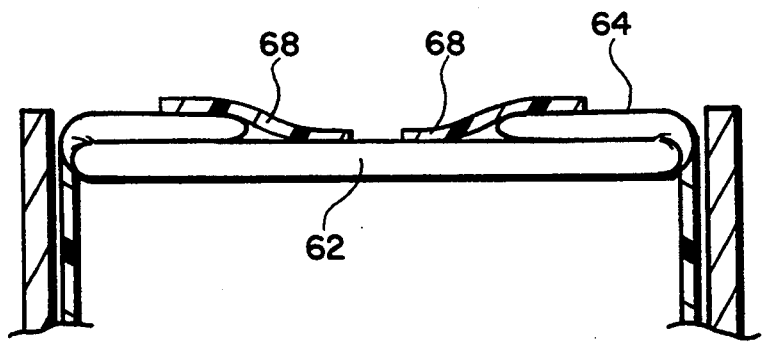
Figure 9:
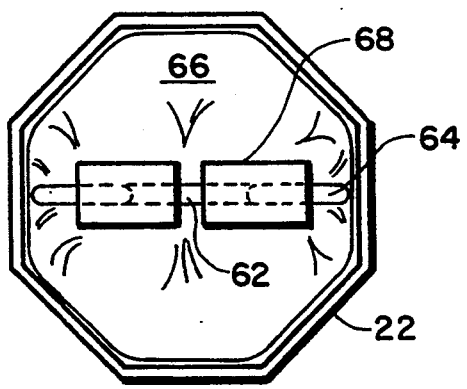

Having thus described the invention in general terms, reference will now be made to the accompanying drawings (three sheets) in which:

FIG. 1 is an exploded perspective view showing certain of the components used in an outer carton forming part of the reusable container assembly of the present invention;

FIG. 2 is a vertical sectional view of a portion of the container assembly of FIG. 1, and showing the use of a plastic liner therein to form part of the container assembly of the invention;

FIG. 3 is a vertical sectional view, somewhat similar to FIG. 2, and showing the step involved in the evacuation of an atmosphere containing vegetables stored in a plastic liner forming part of the container assembly;

FIG. 4 is a vertical sectional view, somewhat similar to FIG. 3, and showing an insertion of a modified atmosphere therein in a sealed liner forming part of the container assembly;

FIG. 5 is a fragmentary sectional view showing the formation of the upper end of one of the liners forming part of the container assembly when sealing the interior atmosphere thereof;

FIG. 6 is a top plan view of the sealed plastic liners in the outer carton;

FIG. 7 shows one of the initial steps in the formation of the sealed upper end of one of the plastic liners forming part of the container assembly;

FIG. 8 is a fragmentary vertical sectional view, similar to FIG. 7, and showing the securement of ends of a roll at the upper portion of the plastic liner forming part of the container assembly; and FIG. 9 is a top plan view of the container assembly, as shown in FIG. 8.

DETAILED DESCRIPTION OF PREFERRED EMBODIMENTS

Referring now in more detail and by reference characters to the drawings which illustrate a practical embodiment of the present invention, A designates a container assembly for the storage and transport of fresh edible produce and like edible food products. The container of the present invention is preferably reusable in a manner to be hereinafter described.

The container assembly A comprises an outer carton or canister 20 having a continuous polygonal side wall 22 and preferably, an octagonally shaped side wall 22 with an opened upper end 24 and an initially opened lower end 26. A bottom section 28 is provided for attachment to the continuous side wall 22 and an upper lid 30 is provided for removable disposition over the upper end 24 of the continuous side wall 22.

Referring again to FIG. 1 of the drawings, it can be seen that the bottom section 28 comprises a bottom wall 32, along with a peripherally extending upstanding rim 34, the latter of which snugly engages the exterior surface of the continuous side wall 22 in proximity to the lower open end 26 and which thereby closes the bottom of the container forming an interior chamber 36. The upper lid 30 is provided with a top wall 38 and a peripherally extending downwardly struck flange 39 for snug fitting engagement with the upper end of the continuous side wall 22.

The outer carton 20, comprised of the continuous side wall 22, the bottom section 28 and the lid 30, is essentially formed of a heavy paperboard material, such as a corrugated cardboard material. Materials of this type are usually highly effective in withstanding substantial amounts of loads and withstanding abuses of the type normally encountered in the transport of food products. However, as can be appreciated, these containers will quickly loose their structural integrity if they should become water saturated. Nevertheless, to the extent that the containers remain relatively free of water saturation, they are quite durable and due to the fact that the side wall 22 is of a polygonal shape and preferably of an octagonal shape, with a large number of sides and corner margins, the outer canister 20 is of sufficient strength to withstand the loading of several like containers filled with produce or similar food products when stacked upon one another.

It has been found in connection with the present invention that by using an octagonally-shaped side wall, containers can be stacked in the desired limit as, for example, three containers in a vertical array when each of the containers may be filled with several hundred pounds of food products. It is oftentimes necessary to use a new bottom section 28 and a new upper lid 30, although the continuous side wall 22 generally maintains its structural integrity and is usually intact for numerous subsequent uses.

It should be understood that other polygonal side wall constructions could be used. For example, the side wall could be hexagonally shaped or it could be pentagonally shaped, etc. In a more preferred embodiment of the present invention, it has been found that the side wall should have no less than six side panels to assume at least a hexagonal shape. However, the octagonal shape is preferred, due to the fact that there are more corner margins and more side wall sections. However, the side wall sections do not have to be the same width so as to rest on a rectangular pallet. It has been found that the corner margins actually function as a type of vertical beam which provides structural integrity to the side wall when other like containers are loaded on top.

Provided for disposition in the interior chamber 36 of the container is a plastic liner 40 which is preferably made of a foldable and bendable plastic material and preferably a material of sufficient thickness so that it is air-tight and essentially air-impervious and water-impervious. Thus, a polyethylene plastic liner, or the like, may be employed. However, numerous other types of plastics could also be used in the formation of this plastic liner.

The plastic liner 40 is preferably constructed in the form of an extruded tube which has a continuous side wall 42 and an enclosing gussetted bottom wall 64 in the manner as best illustrated in FIG. 2. However, the gussetted side wall is provided with an enlarged outwardly flared upper end 46, as best illustrated in FIG. 2.

Referring now to FIGS. 3 and 4, it can be seen that produce, such as lettuce heads 48, can be stored in the plastic liner 40. Thereafter, the upper flared end 46 is folded over in a manner to be hereinafter described thereby forming a sealed interior chamber 50. In the embodiment of the invention, as illustrated in FIG. 2, only a single plastic liner is employed to receive the lettuce or other produce. However, in a more preferred embodiment, a pair of plastic liners are employed as preferably illustrated in FIGS. 3 and 4 of the drawings. In this case, since the operation of sealing and recharging the atmosphere of a single liner is inherent in the description in connection with the evacuating and recharging the atmosphere of a pair of liners, the following description will relate to the use of a pair of plastic liners. However, it should be understood, if desired, that a single liner could be used in connection with the present invention.

As indicated previously, in a preferred embodiment, a double liner is used so that there is an inner liner, such as the liner 40, and an outer liner 52, which is substantially identical in construction to the inner liner 40. Again, the outer liner 52 is also formed in a tubular type construction. After the chamber 50 has been sealed, a needle, pipe or similar thin tubular prong 54 is used to puncture the upper end thereof, as best illustrated in FIGS. 3 and 4 of the drawings. The needle 54 is connected to a vacuum tube 56 for evacuating the interior chamber 50 of the inner liner 40. This will effectively cause the liner 40 to shrink about the lettuce heads 48.

In order to provide a relatively oxygen-free environment for holding the lettuce heads or other produce, the needle 54 is again introduced into the chamber 50 by puncturing the upper surface of the liner 40. In this case, carbon monoxide or other inert gaseous atmosphere, is introduced into the chamber 50. The carbon monoxide or nitrogen gas is introduced into the chamber 50 approximately at the same ambient pressure as the external atmosphere so that there is no substantial air pressure differential on the inner and outer surfaces of the liner 40.

After the needle 54 has been withdrawn, the punctured surface is then sealed. This can easily be accomplished by means of a hermetically sealable tape or like product. Thereafter, the upper lid 30 can be disposed over the upper open end 24 of the container.

In the embodiment of the invention where a pair of liners 40 and 52 are employed, it is then necessary to roll the top of the outer liner 52 in order to form a completely sealed interior chamber 58 which is effectively a gap surrounding the inner liner 40, as best illustrated in FIG. 4. In any event, after the upper surface of the outer liner 52 has been sealed, as hereinafter described, the needle 54 is then introduced into the gap or interior chamber 58 of the outer liner 52, as best illustrated in FIG. 4. In this way, the air atmosphere in the chamber 58 is withdrawn and replaced with carbon monoxide or nitrogen or other inert gas. In like manner, after complete filling of the chamber 58 with an inert atmosphere, the needle is withdrawn and the punctured surface is then sealed. This is also, again, easily accomplished by means of the tape or like product.

It has been found in connection with the present invention that by storage of the lettuce heads, or similar produce, in a relatively air-free environment, there is little or no deterioration and resultant oxidizing of the food products which would otherwise result in discolored portions and the like in an oxygen-containing atmosphere. Consequently, little or no cleaning or outer leaf removal is required when the lettuce product reaches its destination. Furthermore, the provision of a pair of liners has been proven to be highly effective in that even if the outer liner 52 should become punctured during the sealing or transport operation, the inner liner will generally remain intact.

The determination as to whether or not to use a single liner or a dual liner will, to some extent, be based on the thickness of the liner which is employed. When using a relatively thick plastic liner, only a single liner need be used. However, where the liner may be of lesser thickness or where transport distances are long or where rough handling might be anticipated, the use of the dual liner is far preferred. In most cases, in fact, the dual liner is usually preferred due to the added safety factor.

It is also important to provide a liner and a method which is easily sealable without complex machinery or intensive labor input. The present invention also satisfies this requirement. Turning now to FIGS. 5–9 of the drawings, there is illustrated one of the preferred methods of sealing a plastic liner of the type which may be used in the container assembly of this invention.

Referring first to FIGS. 2 and 3, it can be observed that there is initially a substantial amount of plastic material in the liner which extends above the fill line of the produce, that is the upper level of the produce in the liner itself. The upper end of the tubular liner side wall 42 is initially creased at a pair of opposite transverse ends 60 with the upper longitudinal edges brought into contact with one another. These upper edges are then rolled over or one another until there is effectively an elongate roll 62 of the excess material at the upper end of the tubular liner.

Due to the construction of the liner, there are transverse end sections 64 which extend beyond the side wall 42 of the tubular liner. It can be seen that as the two opposed walls of the plastic liner, formed by fold lines at the transverse ends, are rolled over upon one another, they will effectively form a top wall 66 which is integral with the roll 62. Due to the fact that there are several layers of material in the roll, and located in intimate contact with one another, they form an effective airtight seal at the upper end of the liner.

The transverse end sections 64 are then folded over to be disposed on the top wall 66 of the liner, in the manner as best illustrated in FIG. 7 of the drawings. In effect, the roll 62 and the two transverse end sections 64 effectively extend between the folded opposite transverse ends 60 of the liner side wall. The two transverse end sections 64 are then secured to the upper surface of the roll 62 and, in effect, to the top wall 66 of the liner by means of tape strips 68, in the manner as best illustrated in FIG. 8 of the drawings. Any suitable form of tape can be used for securing the transverse end sections 64 to the top wall 66 and the roll 62. In that respect, other means for securing the transverse end sections 64 may also be employed.

It can be seen, in accordance with the present invention, that the extra material formed at the upper end of the liner enables a complete sealing of the liner by simple manual operation and a few pieces of tape strips. Consequently, no complex machinery and no involved mechanical operation is required. Rather, the personnel who load the liners with the produce and who otherwise attend to the process as described herein, can easily gather the two opposed side wall sections of the liner formed by creasing at the transverse ends, bring them together and roll them until they form a tight seal, in the manner as described.

In accordance with the present invention, it can be seen that fresh produce can be cleaned at the growing site, such as a farm site, where the lettuce is refrigerated, outer layers are removed, and the produce packaged and then shipped. In the case of head lettuce, it is not only possible to remove the few outer leaves, it is also possible to literally core the lettuce at the growing site, that is, to remove the center core. Here, again, the cost is further reduced by using relatively inexpensive labor at a farm site, as opposed to more expensive labor at a site of use. Due to the fact that the head lettuce will be packaged in an inert atmosphere, the center core can be removed without the fear of rapid deterioration which would otherwise result in an oxygen-containing atmosphere.

Heretofore, it has been virtually impossible to ship any large quantity of head lettuce of like produce for any significant distance and particularly, for any time other than a few hours without incurring rapid deterioration of the lettuce leaves which were exposed to an oxygen-containing atmosphere. Now, with the provision of the container system of the present invention, it is possible to economically ship large quantities of produce and similar food products with the outer leaves removed and with lettuce heads cored and the like and which are fresh and ready for final salad processing at a destination.

Inasmuch as the outer leaves of the lettuce have been removed, and particularly since it is now possible to core head lettuce, a very substantial portion of the weight which was previously shipped and which had essentially no retail value, has now been eliminated. As a result of using the process and the container systems of the present invention, very substantial freight savings will be achieved. Further, the coring, that is, removing of the head core at a farm site, also eliminates the disposal problem in large metropolitan areas which also results in an increase in overall costs.

One of the unique aspects of the container assembly of the present invention is the fact that there is no need to use fasteners for securing the bottom wall section to the side wall of the container and, indeed, there is no need for using fasteners to secure the lid to the container. The snug fitting peripheral upstanding rim 34 surrounding the bottom wall 32 is usually sufficient to engage an retentively hold itself against the lower end of the container side wall. Furthermore, since these containers are generally stacked upon pallets, the need for fasteners to secure the lower end to the side wall is avoided. In this way, if there is a need to replace either a bottom section or a lid after use, those one or two sections can be replaced with the more expensive side walls remaining intact.

Thus, there has been illustrated and described a unique and novel environmental packaging system for containers and a method of packaging food products therein and which is effective for the storage and transport of food products without the deterioration which would otherwise result and which provides for low cost storage and transport. As a result, the present invention fulfills all of the objections and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A method of packaging lettuce for storing and shipping lettuce in bulk quantities of at least several hundred pounds for long distance transport and reducing the deterioration and discoloration which usually arises during storage and shipping of the lettuce in bulk quantities, said method comprising:

a) fitting an upwardly struck flange of a polygonal shaped paperboard bottom closure on a lower end of a rigid polygonal paperboard construction side wall of a shipping and storage tubular container with a friction fit therebetween and without securement with mechanical fasteners so that the bottom end of the container is closed by said closure, said side wall having at least six sides connected to one another to form a continuous side wall, said bottom closure having substantially the same size and shape as the transverse cross section of the container, said container thereby forming an inner compartment;

b) inserting an inner flexible and foldable liner bag into outer flexible and foldable liner bag and where each have substantially the same size and shape thereby forming a pocket between inner and outer liners;

c) inserting the pair of flexible and foldable liner bags into the rigid container compartment of said container which is sized to snugly receive the bags when filled with lettuce in bulk quantities and opening the upper end of said inner bag to provide access to an interior chamber in said inner bag;

d) introducing fresh lettuce into said interior chamber of said inner bag to substantially fill said chamber of said inner bag with at least several hundred pounds of the fresh lettuce to a desired height therein;

e) closing the opening in said inner bag and sealing same to form a relatively air-tight interior chamber in said inner bag;

f) evacuating said chamber of said inner bag to substantially remove the oxygen therein;

g) recharging the chamber of said inner bag with a gas which is relatively inert to the lettuce to provide an oxygen reduced atmosphere in said chamber;

h) closing the opening in the outer bag and sealing same to form a relatively air-tight pocket between the inner bag and the outer bag;

i) said steps of closing the open upper end of the inner bag and sealing same (step e) and closing the upper end of the outer bag and sealing same (step h) further comprising for each of the inner and outer bags, respectively:

i) rolling excess material at the upper end of the bag into a roll and down onto the contents of the bag to form a top of the bag, ii) folding back outwardly extending transverse end sections of the roll of the bag onto the roll forming a top of the bag so that the transverse end sections are opposed to one another, and iii) securing the traverse end sections to the roll or the top of the bag so that there is an air tight seal to the interior of the bag;

j) evacuating the pocket between the inner and outer bags to substantially remove all oxygen therein;

k) recharging the pocket between the inner and outer bags with a gas which is relatively inert to the lettuce to provide an oxygen reduced atmosphere between the inner and outer bags;

l) maintaining the chamber of the inner bag sealed and the pocket between the inner bag and the outer bag sealed with the oxygen reduced atmosphere until need for access thereto; and m) fitting a downwardly struck flange of a polygonal shaped paperboard lid on the upper end of the side wall with a frictional fit therebetween to close the top end of the container containing the lettuce filled bags containing the oxygen reduced atmosphere without securing the lid to the side wall with mechanical fasteners, said paperboard lid having substantially the same size and shape as the transverse cross section of the container.

2. The method of packaging lettuce as claimed in claim 1 further characterized in that the method comprises coring the lettuce before inserting the lettuce into the inner bag and shipping the cored lettuce.

3. The method of packaging lettuce as claimed in claim 1 further characterized in that the step of securing the transverse end sections comprises applying an adhesive top strip over the transverse end sections and a portion of the top of the bag.

4. A method of packaging lettuce for storing and transporting fresh lettuce in bulk quantities of at least several hundred pounds and in a manner which simultaneously reduces deterioration or discoloration while permitting reusability of container portions used for the storing and transporting, said method comprising:

a) fitting an upwardly struck flange of a polygonal shaped paperboard bottom closure on a lower end of a rigid polygonal paperboard construction side wall of a shipping and storage tubular container with a friction fit therebetween and without securement with mechanical fasteners so that the bottom end of the container is closed by said closure, said side wall having at least six sides connected to one another to form a continuous side wall, said container having an inner compartment and said bottom closure being substantially of the same size and shape as the transverse cross section of the container;

b) inserting a foldable flexible plastic liner bag in a compartment formed in the container and opening the upper end of the bag to expose an interior chamber;

c) introducing the fresh lettuce in the interior chamber of the opened bag until the liner is substantially filled with at least several hundred pounds of the fresh lettuce;

d) closing the open upper end of the bag and sealing same to render the interior chamber sealed;

e) said step of closing the open upper end of the bag and sealing same (step d) further comprising:

i) rolling excess material at the upper end of the bag into a roll and down onto the contents of the bag to form a top of the bag;

ii) folding back outwardly extending transverse end sections of the roll of the bag onto the roll forming a top of the bag so that the transverse end sections are opposed to one another, iii) securing the transverse end sections to the roll or the top of the bag so that there is an air tight seal to the interior of the bag;

f) evacuating the interior chamber of the bag and recharging the chamber with a gas which is relatively inert to the lettuce to provide an inert atmosphere containing a substantially reduced oxygen content; and g) fitting a downwardly struck flange of a polygonal shaped paperboard lid on the upper end of the side wall with a frictional fit therebetween to close the top end of the container containing the lettuce filled bags containing the oxygen reduce atmosphere without securing the lid to the said wall with mechanical fasteners, said paperboard lid having substantially the same size and shape as the transverse cross section of the container.

5. The method of packaging lettuce as claimed in claim 4 further characterized in that said lid is removed at a site of use and said bag is opened and the fresh lettuce is removed therefrom and said container side wall is sealed with a new bottom closure and lid.

6. The method of packaging lettuce as claimed in claim 4 further characterized in that the method comprises:

a) removing the lid at a destination of use of the lettuce and discarding same;

b) removing the lettuce and the bag from the side wall; and c) removing the bottom ,closure and saving the side wall for reuse in again storing and transporting fresh lettuce.

7. The :method of packaging lettuce as claimed in claim 6 further characterized in that the side wall of the container and the lid and bottom closure are all octagonally shaped.

8. The method of packaging lettuce as claimed in claim 4 further characterized in that the side wall of the container and the lid and bottom closure are all octagonally shaped.

* * * * *